United States Patent [19]

Tada et al.

[11] Patent Number: 5,061,368
[45] Date of Patent: Oct. 29, 1991

[54] SYSTEM FOR TREATING WASTE WATER BY NITRIFICATION

[75] Inventors: Minoru Tada, Yokohama; Syouji Harada, Omiya; Syuzo Koike, Urawa; Yukio Kawaguchi, Takatsuki; Tamotsu Mizuguchi, Tokyo; Hiroyoshi Emori, Tokyo; Naomichi Mori, Tokyo; Toshio Yamadera, Tokyo; Masami Hotta, Tokyo; Hiroki Nakamura, Tokyo; Tatsuo Sumino, Tokyo; Takashi Kimata, Urawa; Yuuko Fujii, Mitaka, all of Japan

[73] Assignees: Hitachi Plant Engineering & Construction Co., Ltd.; Japan Sewage Works Agency, both of Japan

[21] Appl. No.: 480,498

[22] Filed: Feb. 16, 1990

[30] Foreign Application Priority Data

Feb. 16, 1989 [JP] Japan ................................ 1-37057

[51] Int. Cl.$^5$ .............................................. C02F 3/30
[52] U.S. Cl. .................................. 210/151; 210/195.1; 210/202; 210/207; 210/903
[58] Field of Search ...................... 210/151, 903, 195.1, 210/196, 202, 203, 205–207, 295, 299, 605, 615–617

[56] References Cited

U.S. PATENT DOCUMENTS

| 4,188,289 | 2/1980 | Besik | 210/903 |
| 4,681,685 | 7/1987 | Sutton et al. | 210/151 |
| 4,696,740 | 9/1987 | Mochizuki et al. | 210/151 |
| 4,731,185 | 3/1988 | Chen et al. | 210/903 |
| 4,929,349 | 5/1990 | Beckman | 210/151 |

*Primary Examiner*—Thomas Wyse
*Attorney, Agent, or Firm*—Sixbey, Friedman, Leedom & Ferguson

[57] ABSTRACT

A system for treating waste water using a particulate body formed by covering and fixing nitrifying bacteria. In the system, the particulate body is inserted in a nitrifying vessel which including therein an air diffusion device for supplying oxygen to the nitrifying bacteria and a particulate body separation device for preventing the outflow of the particulate body. The nitrifying vessel and the particulate body contained therein are used as a nitrifying vessel unit and one or more such nitrifying vessel units are arranged within a treating tank. Waste water is circulated between the nitrifying vessel and the other portions of the treating tank than the nitrifying vessel by means of the air lift effect of the air diffused from the air diffusion device.

10 Claims, 11 Drawing Sheets 5,061,368

SYSTEM FOR TREATING WASTE WATER BY NITRIFICATION

BACKGROUND OF THE INVENTION

1. Field of the Invention

The present invention relates to a system for treating waste water by nitrification and, in particular, to a waste water nitrification treating system using a carrier which is formed by fixing nitrifying bacteria.

2. Description of the Related Art

As a biological treating method for treating organic waste water (which is hereinafter simply referred to as waste water) including nitrogen, there is known an activated sludge circulation method. According to this method, there are arranged a denitrification vessel, a nitrifying vessel and a sedimentation vessel, respectively. Specifically, waste water supplied to the denitrification vessel is affected by denitrifying bacteria under anaerobic conditions in the denitrification vessel so that the nitrogen component of the waste water is caused to turn into nitrogen by means of a reaction $NO_3^- \rightarrow N_2$ to be removed. On the other hand, a treating solution in the denitrification vessel is affected by nitrifying bacteria under an aerobic condition in the nitrifying vessel so that the nitrogen component in the treating solution is caused to change from $NH_3^+ \rightarrow NO_3^-$. The treating solution in the nitrifying vessel, for the most part, is returned through a nitrifying solution circulation line to the denitrification vessel and the nitrogen component $NO_3^-$ of the treating solution of the nitrifying vessel is again caused to turn into nitrogen by means of the above-mentioned reaction in the denitrification vessel and is then removed from the solution. Part of the treating solution of the nitrifying vessel is supplied to the sedimentation vessel. The thus obtained solution is discharged and the sedimented sludge, for the most part, is returned to the above-mentioned denitrification vessel while the remaining portion thereof is disposed as an excess sludge. And, in this treating process, the BOD component of the waste water is also dissolved and removed. The above-mentioned treating method, similarly to a so-called an activated sludge treating method, is a system in which an activated sludge (an aggregate of microorganisms) contributing to reaction floats and circulates, and in this system the nitrifying bacteria that are slow in multiplication rate are easy to flow out from the system as an excess sludge and the activity of the bacteria is greatly lowered in colder water temperatures. In order to solve this problem, there has recently been made a study to enhance the reaction speed by fixing nitrifying bacteria and holding the fixed bacteria in a high density. As a result of this, there is proposed a treating method (Japanese Patent Application Laid-open (TOKKAI) No. 58-40198, West German Patent Application No. P3131989.0) in which a carrier formed by fixing nitrifying bacteria in high molecular water-containing gel is put into a nitrifying vessel according to the activated sludge circulation method so as to be able to remove nitrogen efficiently.

However, in the conventional nitrifying bacteria fixing methods, since the circulation of a nitrifying solution from a nitrifying vessel to a denitrification vessel is made by use of a pump, a power required for treatment is great, which provides another problem to be solved.

SUMMARY OF THE INVENTION

The present invention aims at eliminating the drawbacks found in the above mentioned prior art systems. Accordingly, it is an object of the invention to provide a waste water nitrification treating system which is capable of reducing the power consumption necessary for circulation of a nitrifying solution.

In order to accomplish the above object, according to the invention, there is formed a nitrifying unit comprising a carrier, holding nitrifying bacteria in a high density, which is put into a nitrification treating device including an air diffusion device for supplying oxygen to the nitrifying bacteria and a carrier separation device for preventing the carrier from flowing out. And, one or more of such units are disposed in a waste water treating vessel.

Also, according to the invention, there is arranged a flow passage in the nitrification treating device which allows a solution being nitrified to circulate between the nitrification treating device and an anaerobic reaction vessel comprising the other portions of the waste water treating vessel by use of air diffusion energy.

Due to the fact that the carrier formed of the fixed nitrifying bacteria is kept in the nitrification treating device in this manner, insertion and collection of the carrier can be easily accomplished only by inserting the nitrification treating device into the waste water treating vessel and taking the same system out of the reaction vessel.

Also, the present nitrification treating system can be disposed anywhere in the waste water treating vessel and can be operated so as to fit various kinds of nitrogen removing processes. If the present system is placed in a conventional activated sludge vessel, then ammonical nitrogen in waste water can be easily discharged in the form of nitric acid ion.

Further, the circulation of the nitrifying solution by use of the air diffusion eliminates the need for a circulation pump, which can reduce the power consumption required.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiments of a system for treating waste water by nitrification according to the present invention with reference to the accompanying drawings.

Figure 1:
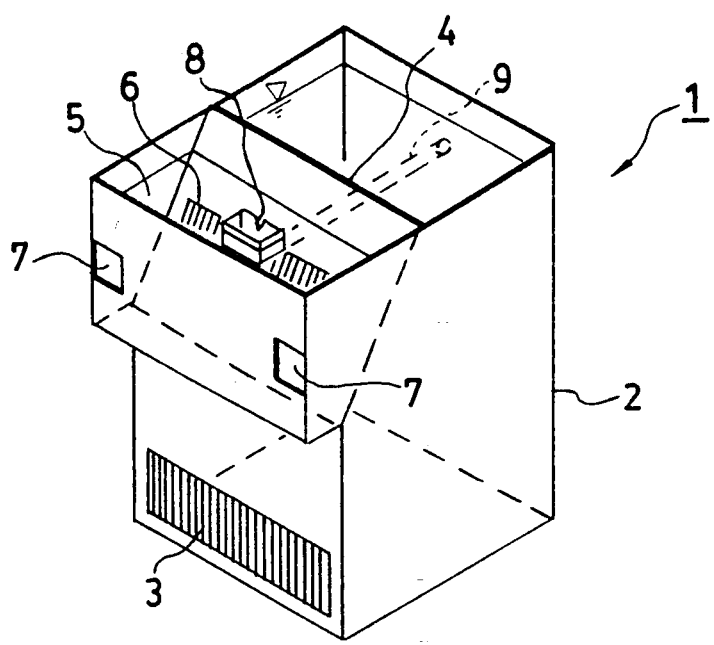
FIG. 1 is a perspective view of an embodiment of a nitrifying vessel unit used to enforce the present invention.
Figure 2:
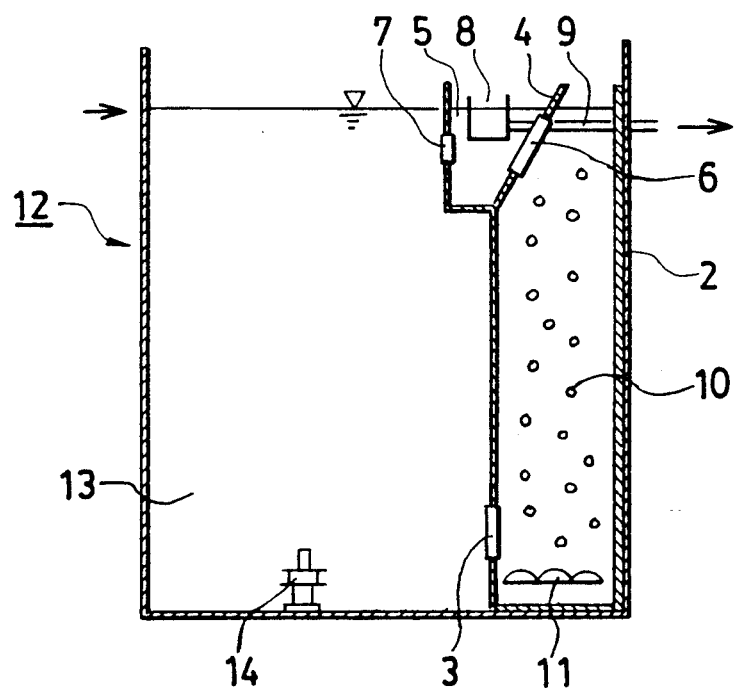
FIG. 2 is a section view of an embodiment in which the nitrifying vessel unit of FIG. 1 is incorporated into an activated sludge treating vessel.

In FIG. 1, there is shown a nitrifying vessel used to enforce the present invention and, in FIG. 2, there is shown an embodiment in which the nitrifying vessel of FIG. 1 is incorporated into a waste water treating vessel with activated sludge. The nitrifying vessel 1 has a main body 2 which is formed in a square vessel shape. The main body 2 has a side surface in the lower portion of which there is arranged an inlet 3 consisting of a screen formed of wedge wires and the like. In the upper portion of the side surface, there is provided an upper space 5 which is divided from the nitrifying vessel main body 2 by an inclined plate 4. In the upper space 5, there is arranged an outlet 6 consisting of a screen formed of wedge wires and the like and, in the side surface portion that forms the upper space 5, there are formed two openings 7 which are disposed at a given distance. In the upper space 5, there is arranged a weir 8 to which is connected a pipe 9. The pipe 9 extends through the inclined plate 4 and the side wall of the nitrifying vessel main body 2 and communicates with the exterior of the vessel main body 2. Also, within the nitrifying vessel main body 2, there are contained a plurality of nitrifying bacteria carrying pellet 10 in such a manner that they are able to flow. The effective pellet 10 may be formed by fixing nitrifying bacteria into a bead shape by use of a gellable organic compound such as polyethylene glycol. Also, in the bottom portion of the nitrifying vessel main body 2, there is disposed an air diffusion device 11. The thus structured nitrifying vessel 1 (which is referred to as a nitrifying vessel unit hereinafter) is, as shown in FIG. 2, disposed on one side surface of an activated sludge treating vessel 12, to be exact, a waste water treating vessel using activated sludge, and the other inside portions of the activated sludge treating vessel 12 than the nitrifying vessel 1 form an anaerobic vessel 13.

And, the anaerobic vessel 13 and nitrifying vessel main body 2 are arranged such that waste water can be circulated between the nitrifying vessel main body 2 and anaerobic vessel 13 by means of the inlet 3, outlet 6 and openings 7. Also, in the bottom portion of the activated sludge treating vessel, there is arranged a stirrer 14.

Next, description will be given below of a waste water treating method in the above-mentioned activated sludge treating vessel.

A waste water supplied to the anaerobic vessel 13 is stirred by the stirrer 14 to be mixed with floating sludge and the mixed solution is then flowed through the inlet 3 into the nitrifying unit 1. Within the nitrifying vessel unit 1, the nitrogen component of the waste water is nitrified due to the action of the pellet 10 fluidized by the air that is supplied from the air diffusion device 11, and thereafter the mixed solution is flowed out into the upper space 5 through the outlet 6 due to the upward stream. Part of the mixed solution within the upper space 5 is fed from the overflow weir 8 through the pipe 9 to a sedimentation vessel (not shown), and the remaining portions of the mixed solution are circulated through the openings 7 to the anaerobic vessel 13, in which the BOD component of the waste water is used to remove the nitrogen thereof. In the sedimentaton vessel, the mixed solution is divided into solid and liquid and the supernatant water is discharged.

As mentioned above, due to the fact that the air diffusion device 11 is disposed in the bottom portion of the nitrifying vessel unit 1, the inlet 3 is disposed in the bottom portion of the side surface of the nitrifying vessel, and the outlet 6 is disposed in the inclined plate 4, respectively, the circulatory flow can be obtained with ease by means of the air lift effect of the air diffused from the air diffusion device 11. Also, oxygen in the air from the air diffusion device 11 is given to the nitrifying bacteria to stir the pellet 10. And, the amount of the circulating water can be adjusted by forming the openings 7 such that the open area thereof is adjustable. The amount of the circulating water is adjusted to be 1~10 times the amount of inflow of the waste water, preferably, 2~5 times. Also, the amount of the circulating water can be controlled by adjusting the amount of the air diffused from the air diffusion device 11.

Figure 14:
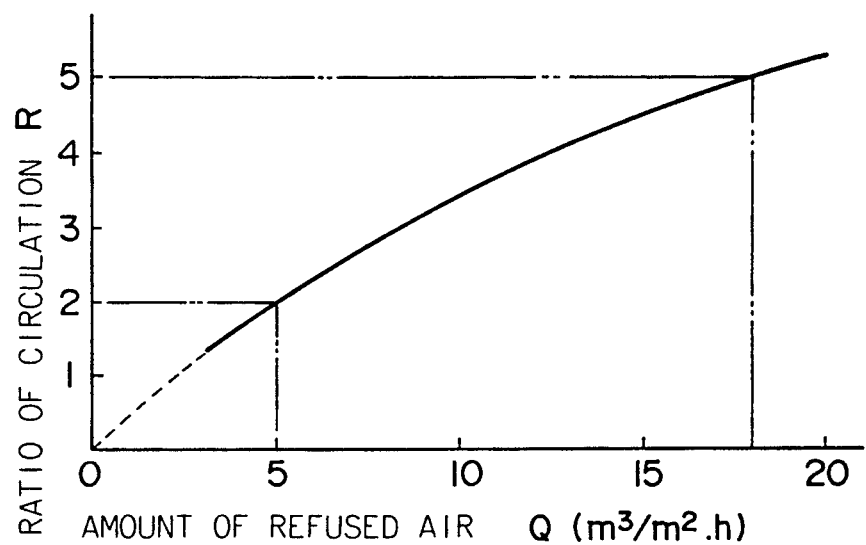
FIG. 14 is a view to shown a relation between an amount of diffusion air and a ratio of circulation.

In FIG. 14, there is shown an experimental result on the relation between the amount of air diffused Q and the ratio of circulation R ( a ratio of a standard amount of flow of waste water to the amount of circulation water). The amount of air diffused Q is represented by the amount of flow as per the effective sectional area of the nitrifying unit 1. According to this figure, the amount of air diffused Q and the ratio of circulation R are almost proportional to each other in a practical range and, from this figure, it is known that the amount of air diffused may be adjusted to be 5~18m$^3$/m$^2$. h in order to realize a preferable range of the above ratio of circulation R, 2~5.

Also, with use of the pellet which is formed by fixing nitrifying bacteria, the rising of the nitrifying activity thereof is fast, the activity thereof is stable, and a stable efficiency in removing nitrogen can be obtained. Especially, if activated sludge containing nitrifying bacteria is once domesticated to enhance the density of the nitrifying bacteria before the nitrifying bacteria are fixed, then the fast rising of the nitrifying activity can be obtained and, even if the collected sludge is used as it is, the rising of the nitrifying activity can be seen in a relatively earlier time because the sludge can be fixed in a high density state.

The grain diameter of the pellet is smaller, the specific surface area is larger, so that the nitrifying activity per unit volume can be improved However, if the pellet grain diameter is too small, then the pellet is easy to flow out from the outlet 6 consisting of a screen of wedge wires or the like, which is undesirable. For this reason, the grain size of the pellet is practically selected in a range of 1.5 or more, preferably, 2.0 mm ~ 10.0 mm.

When the rate of filling of the pellet is small, then the nitrifying reaction speed is lowered and, when the filling rate is large, then the fluidization of the pellet is insufficient. Therefore, the filling rate of the pellet is practically selected in the range of 5 ~ 60%, preferably, 5 ~ 30%.

Figure 3:
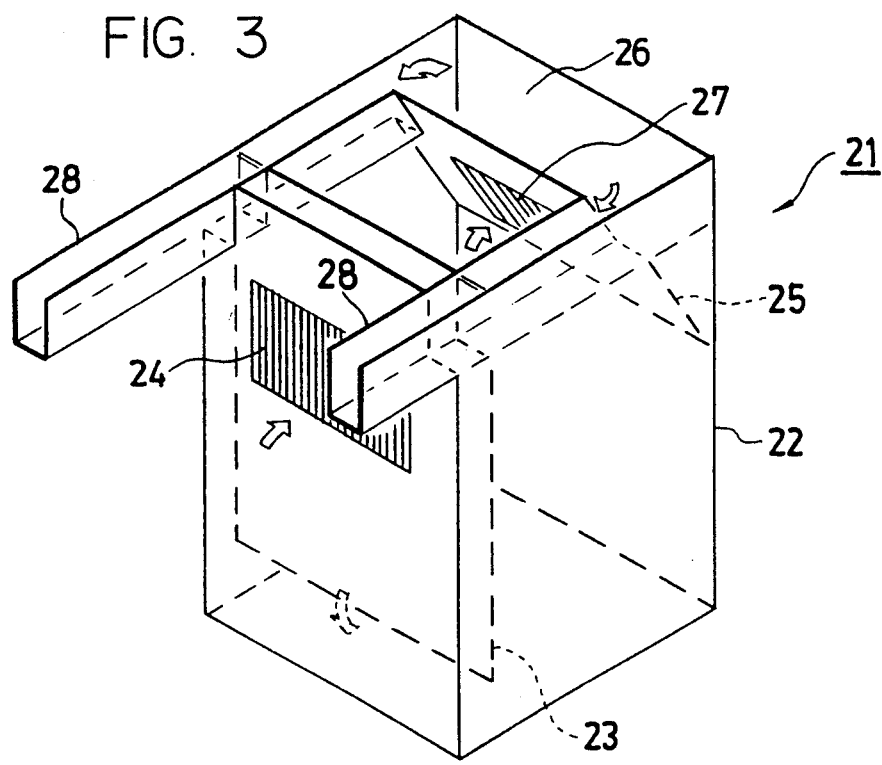
FIG. 3 is an embodiment of a nitrifying vessel unit used to enforce the present invention.
Figure 4:
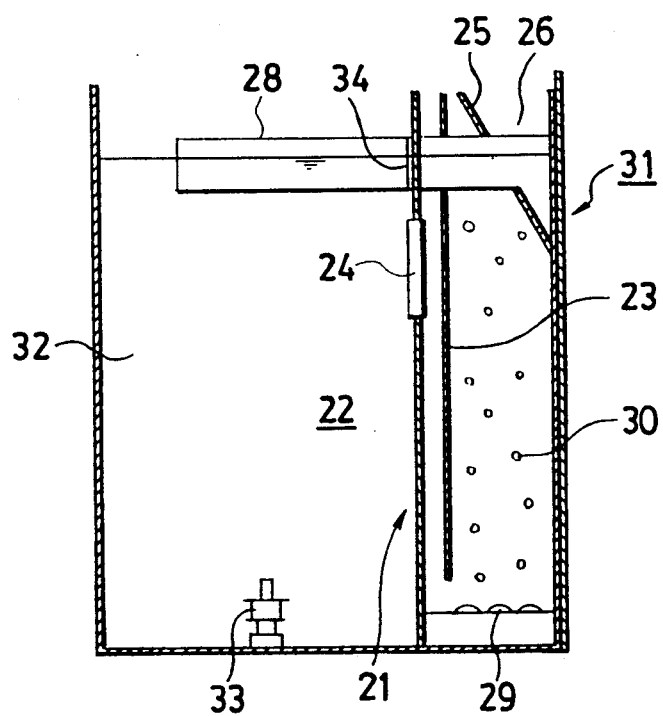
FIG. 4 is a section view of an embodiment in which the nitrifying vessel unit of FIG. 2 is incorporated into an activated sludge treating vessel.

Now, in FIG. 3, there is shown a perspective view of another embodiment of a nitrifying vessel unit which is disposed in an activated sludge treating vessel, and in FIG. 4 there is shown a section view to illustrate how the nitrifying vessel unit of FIG. 3 is disposed in the activated sludge treating vessel.

A nitrifying vessel unit 21 has a main body 22 the interiors of which are divided into two sections by a partition plate 23 in such a manner that the two sections communicate with each other in the lower portions thereof. In one side surface of the nitrifying vessel main body 22, there is formed an inlet 24 and, on the opposite side surface to the side surface with the inlet 24, there is provided an inclined plate 25 to form an upper space 26. In the inclined plate 25, there is formed an outlet 27 consisting of a screen of wedge wires or the like, whereby the upper space 26 is able to communicate with the interiors of the vessel located below the upper space 26. And, in the upper space 26, there are provided one or more water passages, in this figure, a pair of water passages 28. In the nitrifying vessel unit 21, similarly as in the above-mentioned embodiment, there is provided an air diffusion device 29 and, within the nitrifying vessel main body 22, there is contained a pellet 30 formed by fixing nitrifying bacteria in such a manner the pellet 30 is flowable.

The thus constructed nitrifying vessel unit 21 is, as shown in FIG. 4, disposed on the side of one side surface of an activated sludge treating vessel 31 and the remaining portions of the treating vessel 31 except the nitrifying vessel unit 21 form and anaerobic vessel 32 in which there is arranged a stirrer 33. In Fig, 4, 34 designates a flow control device.

In the present activated sludge treating vessel (that is, a waste water treating vessel using the activated sludge), the inlet 24 is disposed below but adjacent to the water surface and the lower end portion of the partition plate 23 is arranged to reach the deep portion of the vessel. Due to this, a mixed solution comprising the waste water flowing from the inlet 24 into the nitrifying vessel unit 21 and the activated sludge is allowed to flow in a downwardly moving stream. This prevents the pellet 30 from flowing out from the inlet 24, which may eliminate the need for provision of the screen of wedge wires or the like in the inlet 24.

Also, since the outlet 27 is formed in the inclined plate 25, the air moving upwardly from below and the pellet 30 collide with the surface of the outlet 27 comprising a screen of wedge wires or the like to thereby rinse dirt out of the screen, with the result that the clogging of the screen can be removed, requiring no backward cleaning or similar operation.

The mixed solution that has flown out of the outlet 27 is circulated through the water passage 28 to the anaerobic vessel 32. Thus, the mixed solution from the nitrifying vessel unit 21 is circulated by the water passage 28 to a portion of the anaerobic vessel 34 adjacent to a waste water inflow portion thereof which provides a high nitrogen removing effect. Alternatively, there may be arranged a weir (not shown) in the outlet of the water passage so as to be able to control the amount of circulation of the mixed solution.

Figure 5:
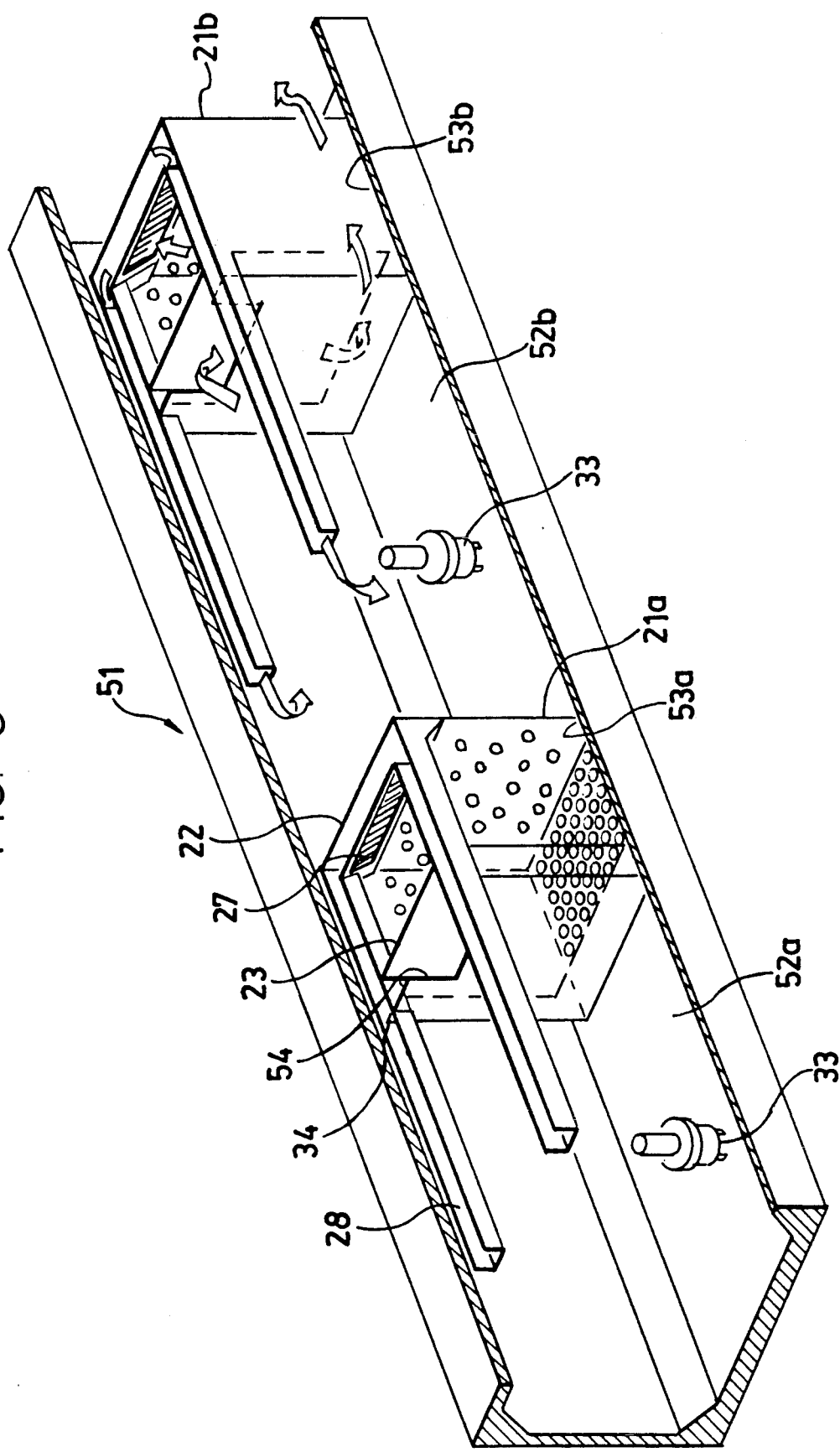
FIG. 5 is a main portion broken and perspective view of an embodiment of an activated sludge treating vessel used to enforce the present invention.

Referring now to FIG. 5, there is shown a main portion broken and perspective view of another embodiment of a waste water treating vessel using activated sludge which is used to enforce the present invention.

The illustrated activated sludge treating vessel is a large-size activated sludge treating vessel 51 in which the nitrifying vessel units 21a, 21b respectively shown in FIG. 3 are spaced from each other at a given distance and between the outer surfaces of the nitrifying vessel units 21a, 21b and the inner walls of the activated sludge treating vessel 51 there are provided clearance portions 53a, 53b respectively communicating with their respective anaerobic vessels 52a, 52b. Also, 54 designates a weir which corresponds to the above-mentioned inlet 24. For this reason, in FIG. 5, the same parts as in FIGS. 3 and 4 are given the same designations and the structural description is omitted here.

In the activated sludge treating vessel 51, waste water flows from the left end in this figure, and the mixed solution of the waste water and activated sludge of the first vessel, that is, anaerobic vessel 52 flows in part in to the first nitrifying vessel unit 21a, while the remaining portion thereof flows through the clearance portion 53a into the second vessel, that is, anaerobic vessel 52b. Similarly, the mixed solution of the anaerobic vessel 52b flows in part into the second nitrifying vessel unit 21b, while the remaining portion thereof flows through a clearance portion 53b into a following step.

Alternatively, in place of the nitrifying vessel units 21a, 21a shown in FIG. 5, the nitrifying vessel unit 1 shown in FIG. 1 may be disposed within the activated sludge treating vessel 51.

Figure 6:
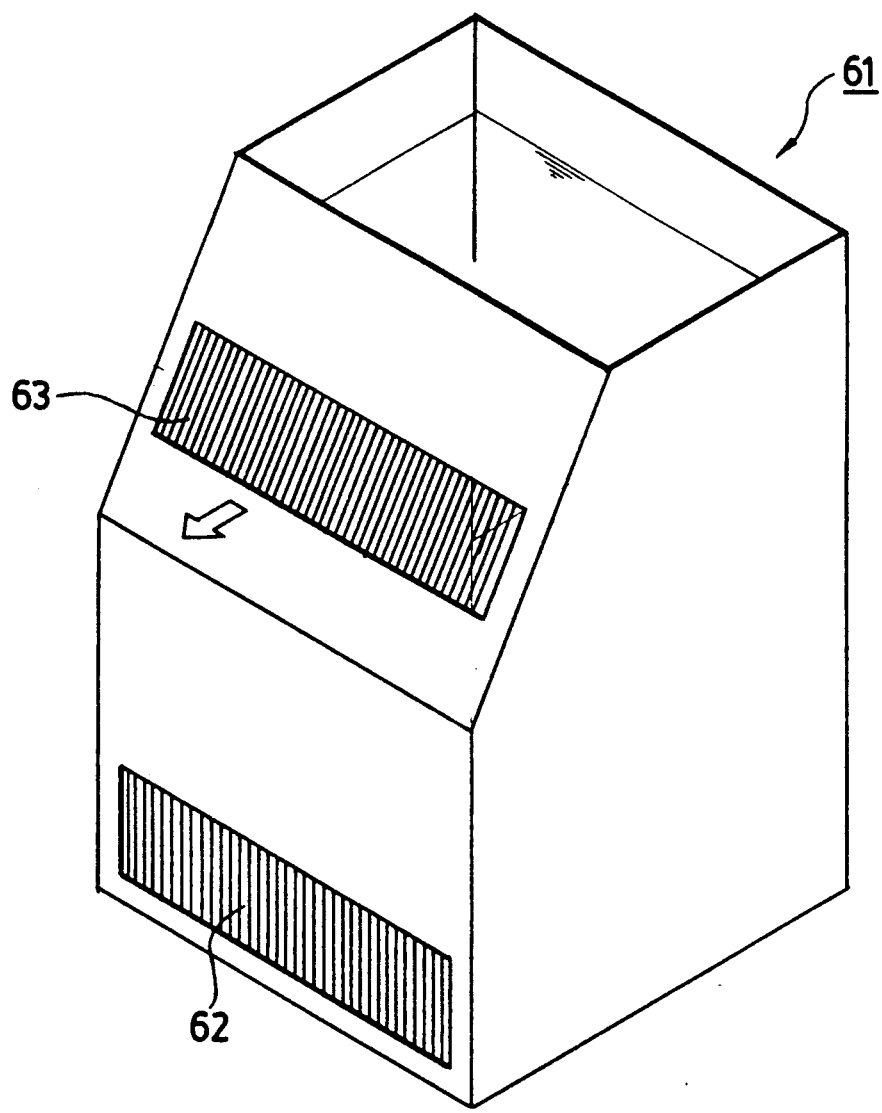
FIG. 6 is a perspective view of another embodiment of the nitrifying vessel unit.

In FIG. 6, there is shown a perspective view of another embodiment of a nitrifying vessel unit used to enforce the present invention. This nitrifying vessel unit 61 has a main body and in the lower portion of one side surface of the main body there is formed an inlet 62 which comprises a screen of wedge wires or the like. The upper portion of the side surface has an inclined surface which is inclined toward the inside of the vessel, and in the inclined surface there is formed another outlet 63 which comprises a screen of wedge wires or the like. The present embodiment is similar to the before-mentioned embodiment in that the pellet is stored within the nitrifying vessel unit 61 and in that it has an air diffusion device.

The nitrifying vessel unit 61 is disposed within the activated sludge treating vessel as in the before-mentioned embodiment.

Figure 7:
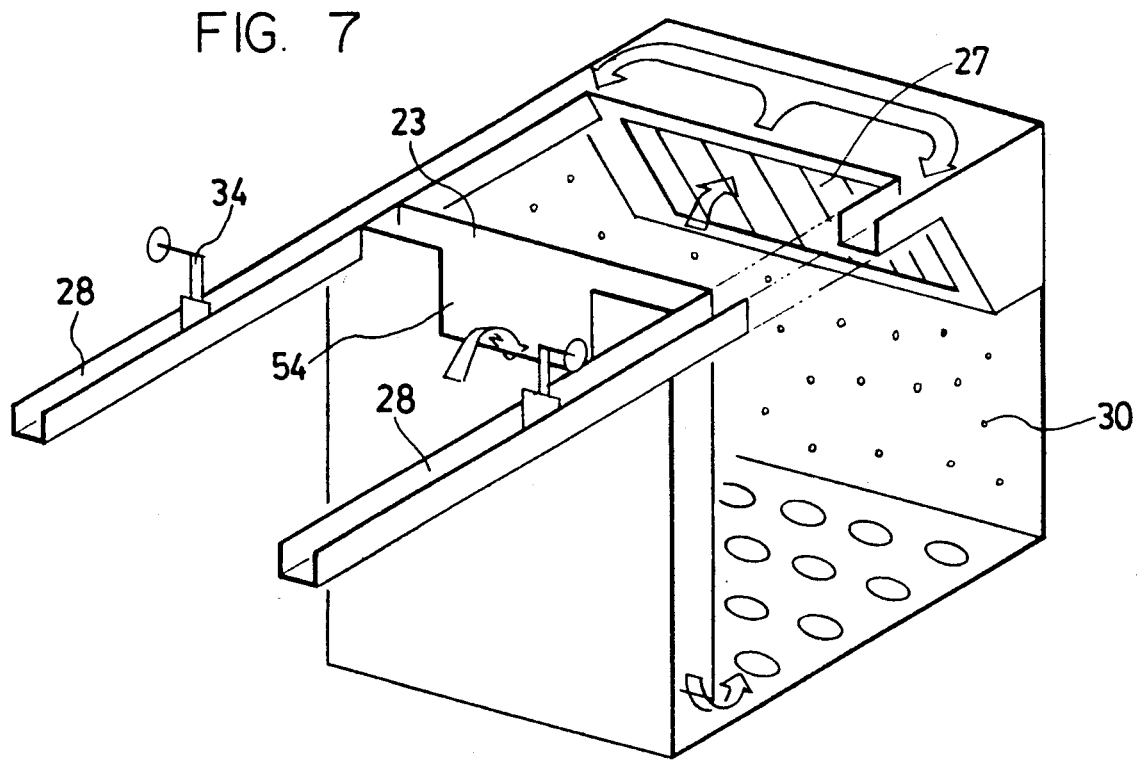
FIG. 7 is an enlarged and detailed view of the nitrifying vessel unit in FIG. 5.
Figure 8:
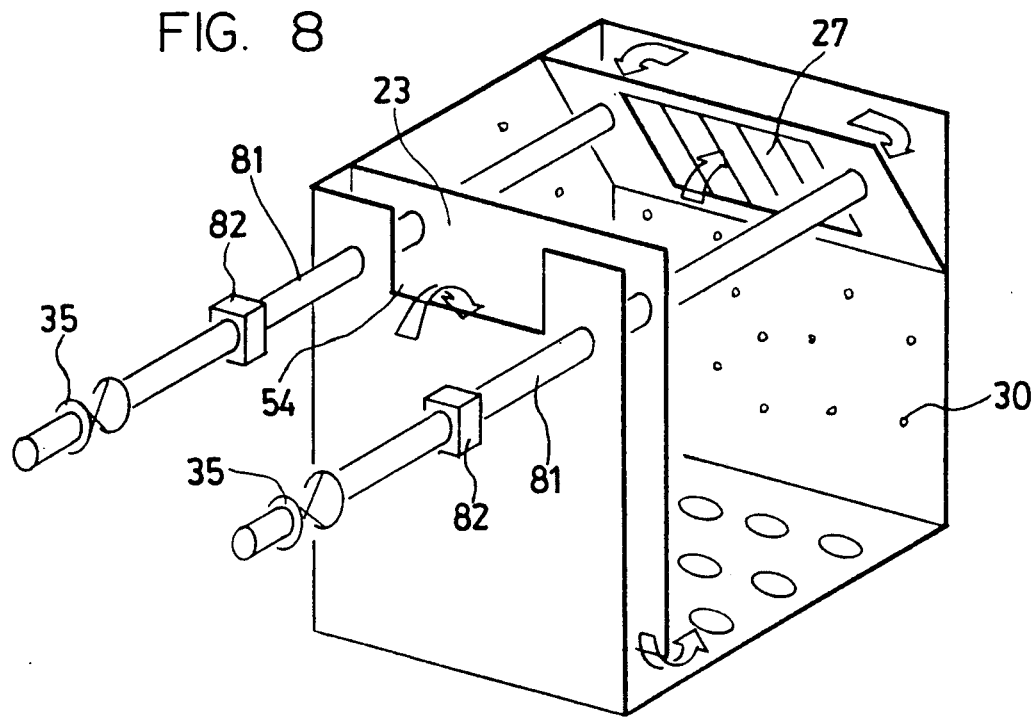
FIG. 8 is a main portion broken and perspective view of another embodiment of the nitrifying vessel unit.

Referring now to FIG. 7, there is shown an enlarged detailed view of the nitrifying vessel unit in FIG. 5. In FIG. 8, there is shown a main portion broken and perspective view of a further embodiment of a nitrifying vessel unit.

The nitrifying vessel unit in FIG. 8 is different from that in FIG. 7 in that the upper portion thereof is open and a water passage 81 comprising a pipe arrangement is used in place of the water passage 28 having a rectangular section. 82 designates a flow meter and the degree of opening of a flow control valve 35 is controlled in accordance with the indication value of the flow meter 82. Similarly to the nitrifying vessel unit shown in FIG. 3, the nitrifying vessel unit in FIG. 8 is disposed within an activated sludge treating vessel. Here, the water passage or pipe used for circulation from the nitrifying vessel unit to a nitrogen removing vessel may be a single or plural.

Figure 9:
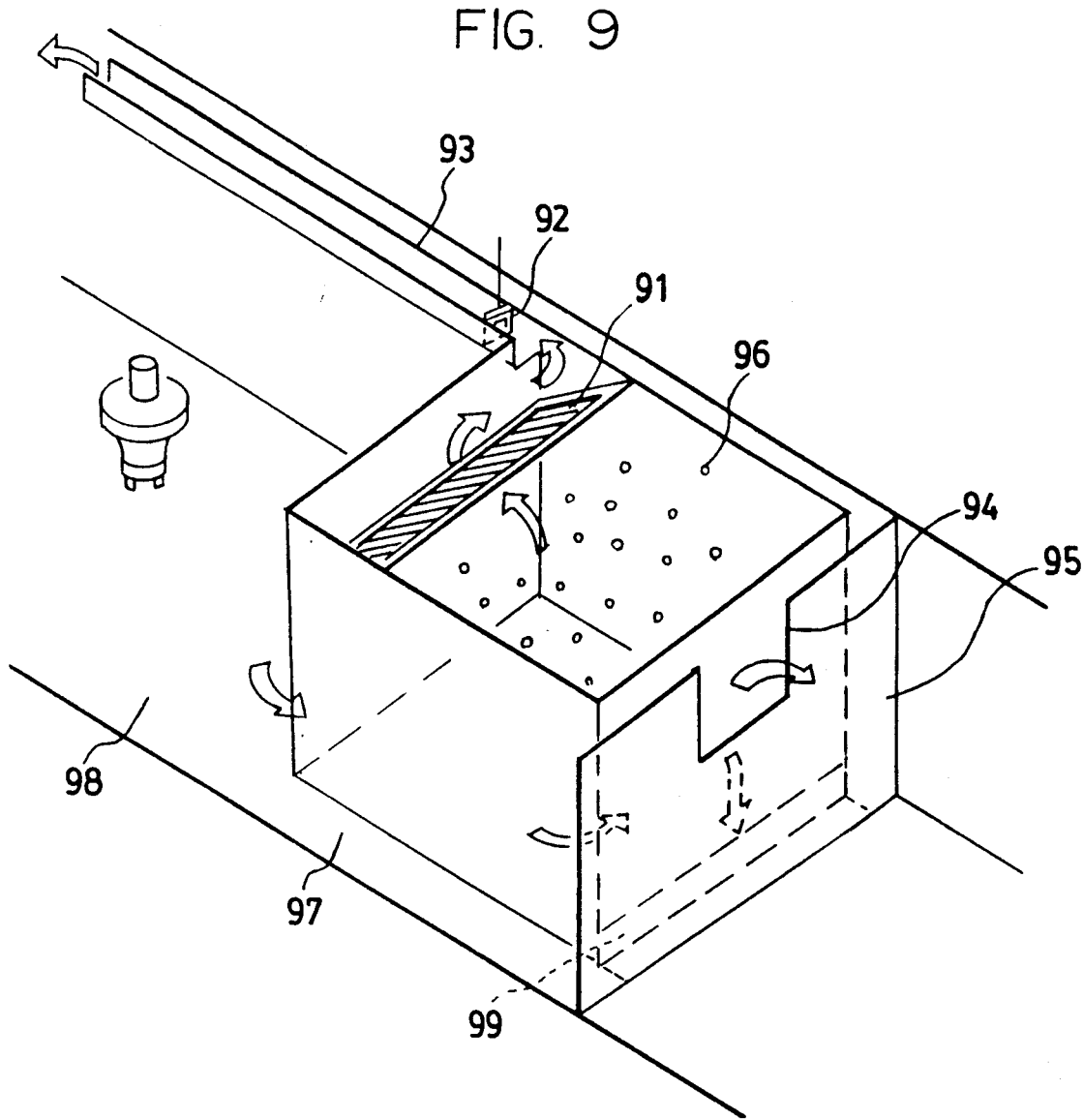
FIG. 9 is a perspective view of a further embodiment of the nitrifying vessel unit.
Figure 10:
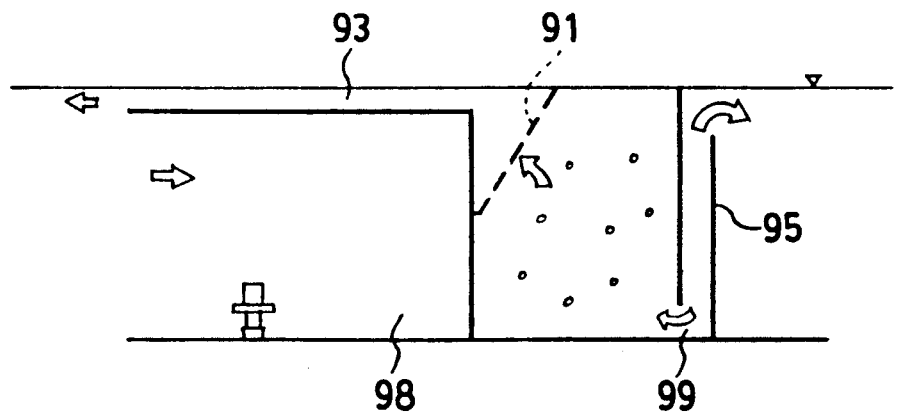
FIG. 10 is an explanatory view of the state of flow of waste water in an activated sludge treating vessel using the nitrifying vessel unit of FIG. 9.

Now, in FIG. 9, there is shown a perspective view of a still further embodiment of a nitrifying vessel unit according to the invention and, in FIG. 10, there is shown an explanatory view to illustrate how a waste water flows in an activated sludge treating vessel using a nitrifying vessel unit.

In this nitrifying vessel unit, there is formed in the upper portion thereof an outlet 91 which comprises a screen formed of wedge wires or the like and there is arranged a water passage 93 including a flow rate control device 92 on the one end side of the outlet 91. The nitrifying vessel unit is disposed in such a manner that it has a clearance portion between the inner wall of the activated sludge treating vessel and itself. On the opposed surface to the surface with the outlet 91, there is disposed a partition plate 95 formed with an overflow weir 94 such that it is located at a given distance from the side surface of the nitrifying vessel unit.

A mixed solution within an anaerobic vessel 98 flows through a clearance portion 97 between the nitrifying vessel unit and the activated sludge treating vessel into the nitrifying vessel unit from an inlet 99 provided in the rearward lower portion of the nitrifying vessel unit, in which the mixed solution goes through a nitrification treatment in such a condition as containing the air diffused from an air diffusion device (not shown) and a pellet 96. After then, the mixed solution is circulated from the outlet 91 into the anaerobic vessel through the water passage 93, is passed through the clearance portion 97, and is supplied from the overflow weir 94 to a next step (for example, an anaerobic vessel in the following process).

Figure 11:
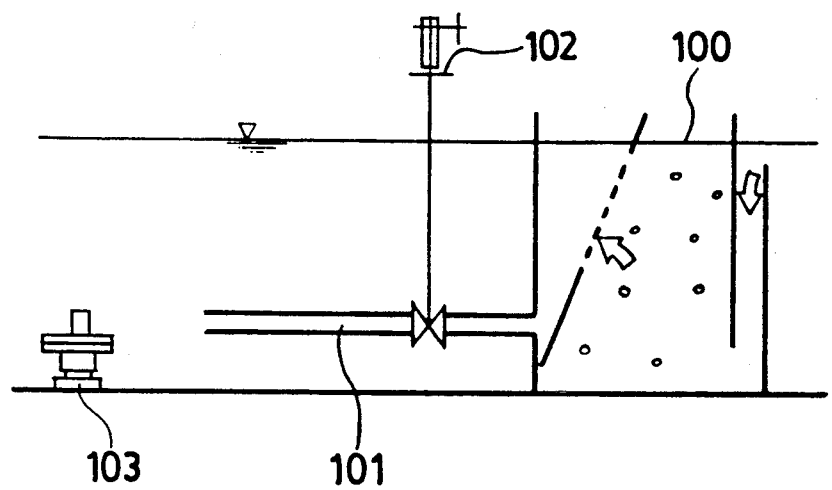
FIGS. 11 and 12 are schematic structure views, respectively showing further embodiments of the activated sludge treating vessel used to enforce the present invention.
Figure 12:
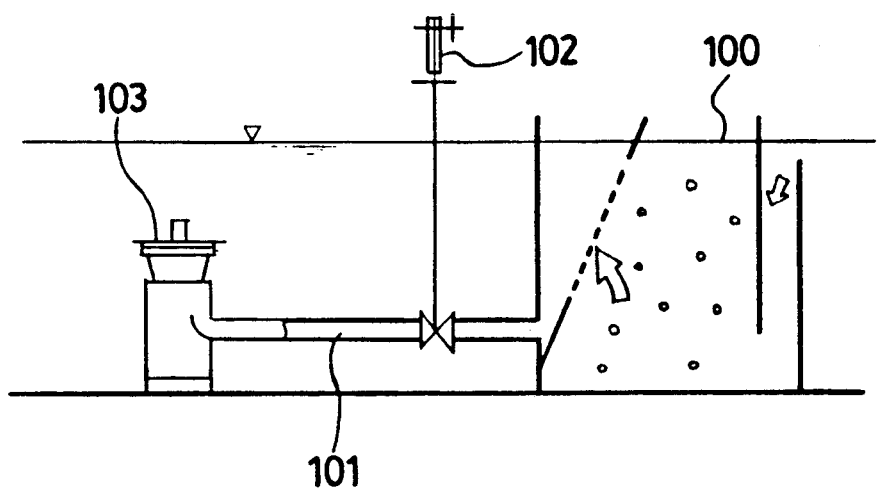

Referring now to FIGS. 11 and 12, there are shown schematic structural views respectively of another embodiments of a waste water treating vessel with activated sludge used to enforce the present invention. In FIG. 11, there is provided a nitrifying unit 100 and a nitrifying solution circulation guide pipe 101 is connected to and extends from the nitrifying unit 100. The guide pipe 101 is provided with a flow control device 102 and the leading end of the nitrifying solution circulation guide pipe 101 is located adjacent to a stirrer 103 which is arranged within an anaerobic vessel. Also, in FIG. 12, a nitrifying solution circulation guide pipe 102 extending from a nitrifying unit 100 is provided with a flow control device 102 and the leading end of the nitrifying solution circulation guide pipe 102 is located adjacent to an intake port of a stirrer 103.

Figure 13:
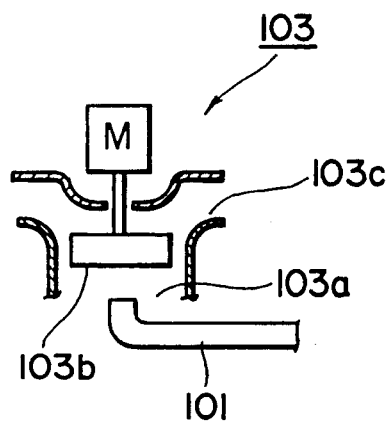
FIG. 13 is a main portion enlarged principle explanatory view of the embodiment of FIG. 12.

In the embodiment shown in FIGS. 11 and 12, the circulation of the nitrifying solution can be executed efficiently and the mixing of the nitrifying solution in the anaerobic vessel can be promoted, thereby enhancing a nitrogen removing reaction efficiency. Especially, in the embodiment shown in FIG. 12, as shown in FIG. 13, due to the fact that the opening of the leading end portion of the nitrifying solution circulation guide pipe 101 is located adjacent to the intake port 103a of the stirrer 103 using the principle of an underwater pump, the nitrifying solution is discharged out from a discharge port 103c due to a pumping effect caused by the rotation of an impeller 103b. This allows the nitrifying solution to be circulated and mixed efficiently. Also, the stirrer 103 may be a pumping device such as an underwater pump and the like. Further, the illustrated method using the stirrer 103 or the pumping device such as an underwater pump and like may be applied to the nitrifying vessel unit shown in FIG. 8 as well.

Figure 15:
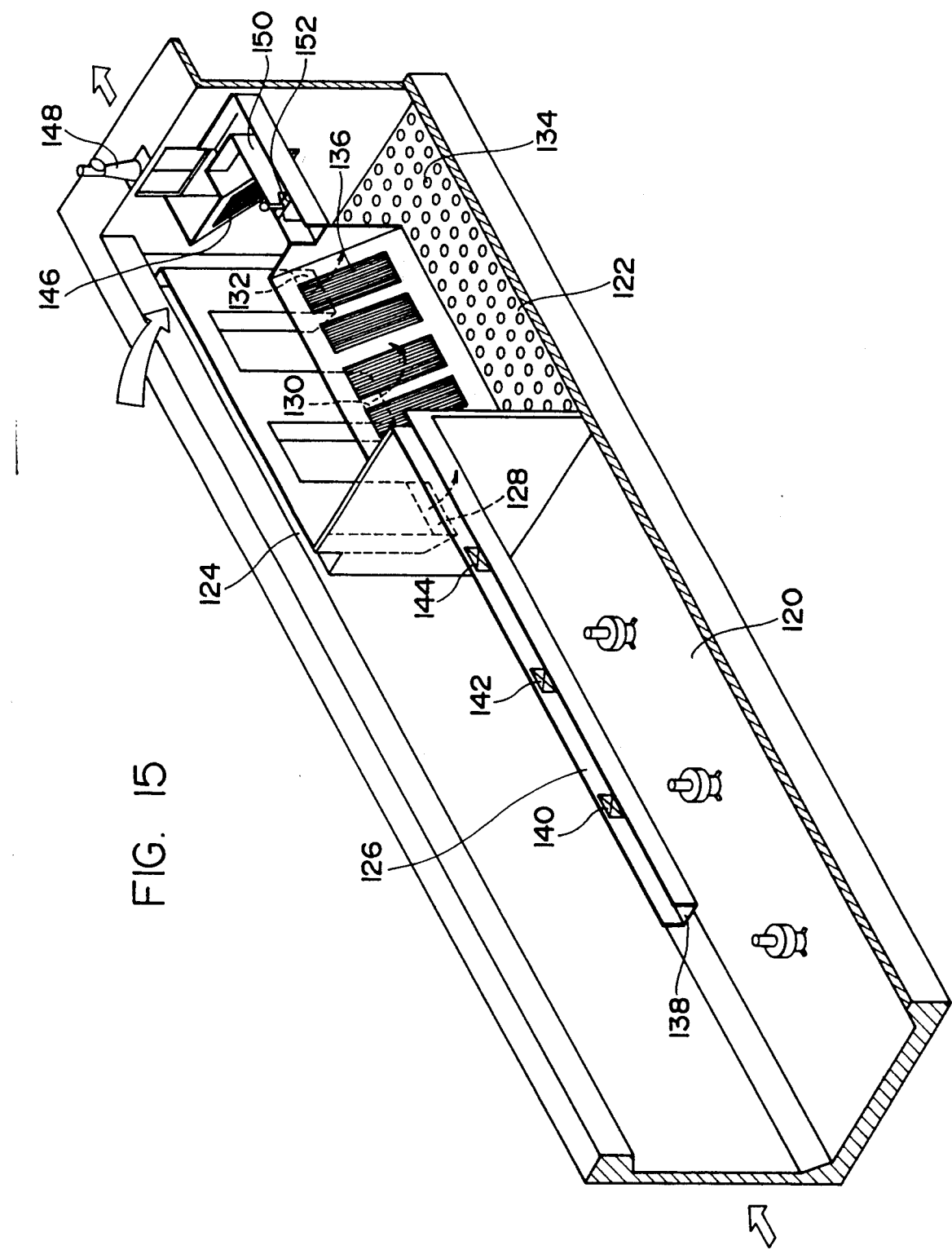
FIG. 15 is a perspective view of another embodiment according to the present invention.

In FIG. 15, there is shown a perspective view of a still further embodiment of a waste water treating vessel with activated sludge used to enforce the present invention. The present embodiment is suitable for treatment of a comparatively larger volume of waste water. An anaerobic vessel 120 and an adjoining nitrifying vessel 122 communicate with each other by means of an inflow water passage 124 to the nitrifying vessel and a circulation water passage 126 for a nitrifying solution. From the inflow water passage 124, three inflow ports 128, 130 and 132 are diverged and opened downwardly. An air diffusion device 134 is disposed in the bottom portion of the nitrifying vessel 122. As in the above mentioned respective embodiments, in the present nitrifying vessel there is contained a pellet (not shown) and the pellet can be separated by wedge wires 136. The nitrifying solution that has passed through the wedge wires 136 is then circulated to the anaerobic vessel 120, that is, the nitrifying solution is then divergingly flowed through a plurality of outflow ports 138, 140, 142, 144, which are formed in the abovementioned circulation water passage 126, into the anaerobic vessel 120.

Also, in the nitrifying vessel 122, in addition to the above-mentioned wedge wires 136, there are arranged another wedge wires 146 for treating water and the nitrifying solution can be discharged through a movable weir 148 to a final sedimentation tank (not shown). The respective outflow sides of the wedge wires 136 and 146 communicate with one another by means of a connecting water passage 150. Accordingly, by controlling a flow control device 152, the volume of the nitrifying solution running back from the circulation water passage 126 to the anaerobic vessel 120 and the volume of the nitrifying solution to be discharged through the movable weir 148 externally of the system can be controlled.

According to the present embodiment, since the inflow ports 128, 130, 132 and the outflow ports 138, 140, 142, 144 are arranged separately from one another, with use of a nitrifying vessel and an anaerobic vessel having a large capacity, the solution can be dispersed uniformly so that an excellent circulation system can be provided.

Figure 16:
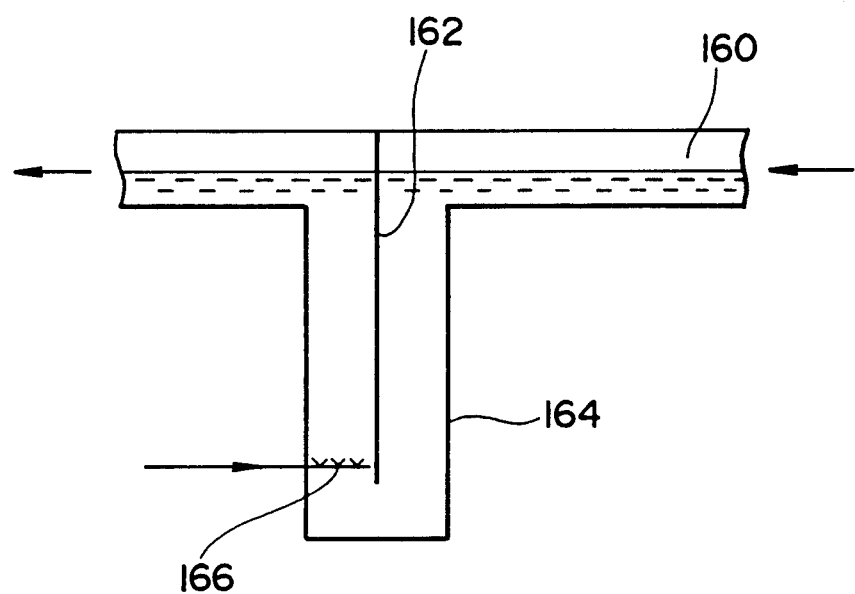
FIG. 16 is a partial structure view of a modified embodiment according to the present invention; and, FIGS. 17, 18, 19, 20 and 21 are schematic structure views, respectively showing another embodiments used to enforce the present invention.
Figure 17:
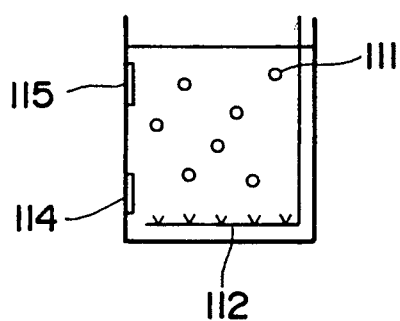
Figure 18:
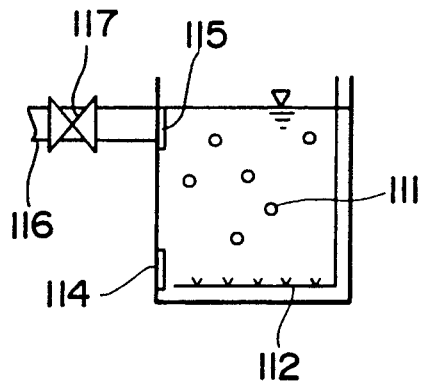
Figure 19:
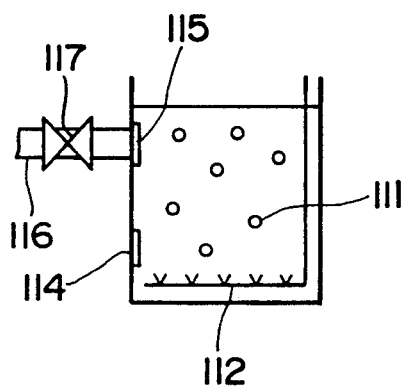
Figure 20:
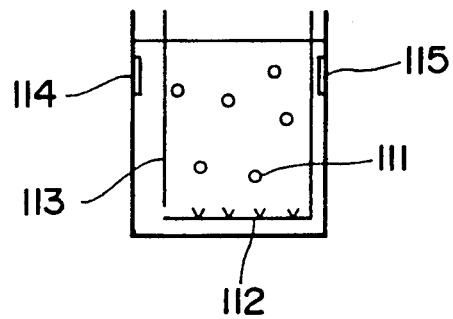
Figure 21:
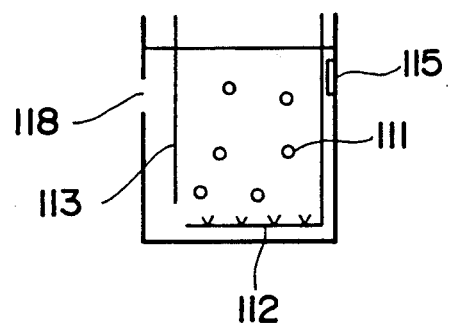

In FIG. 16, there is shown a partial structure view of a modified embodiment used to enforce the present invention. In this embodiment, a circulation water passage 160 for a nitrifying solution includes in the intermediate portion thereof a hanging portion 164 provided with a partition plate 162, with an air diffusion device 166 being disposed in the lower portion of the hanging portion 164. According to the present structure, due to the air lift action caused by the air diffused from the air diffusion device 166, the volume of circulation of the nitrifying solution can be increased. In other words, the present structure can be used as an auxiliary means for increasing or controlling the amount of circulation.

Now, the embodiments described hereinbefore are examples of various embodiments according to the invention. In brief, the nitrifying vessel unit used in the invention may be constructed in various ways, provided that it has such a structure as can be disposed only by putting it into a waste water treating vessel with activated sludge and, if the nitrifying vessel unit contains a pellet therein, it may only have a structure that prevents the pellet from flowing out externally of the nitrifying vessel unit when a solution contained within the nitrifying vessel unit flows. Therefore, a nitrifying vessel unit according to the invention may have a structure the principles of which are illustrated in FIGS. 17 ~ 21 In FIG. 17 ~ 21, 111 designates a pellet, 112 an air diffusion device, 113 a partition plate, 114 an inlet, 115 an outlet, 116 a nitrifying solution circulation guide pipe, 117 a flow control device, and 118 an overflow weir, respectively.

Each of the inlet 114 and outlet 115 in FIGS. 17 ~ 21 comprises a screen of wedge wires or the like.

The mesh size of the above-mentioned screen of wedge wires or the like is determined by the size of the pellet and the like. For example, when the size of the pellet is 1.5 mm ~ 4 mm, the mesh size of the screen is preferably 0.5 ~ 1.5 mm.

It is much preferable that the screen of wedge wires or the like provided in the outlet for separation of the pellet may be inclined. In other words, the pellet that is caused to flow about by the diffused air collides with the inclined surface of the screen of wedge wires or the like and, due to such collision, the surface of the pellet is always rinsed. Thanks to this, breeding and attachment of bacteria and micro-particles on the pellet surface can be prevented, thereby maintaining the nitrifying activity all the time. Also, the free movement of the pellet can be ensured and the above-mentioned collision action can rinse the screen of wedge wires or the like to thereby prevent the clogging of the screen. Our experiment has shown that the angle of inclination of the screen is preferably in the range of 30° ~ 60°.

The direction of the meshes of the screen should be vertical. In other words, when the screen meshes are in the vertical direction, then the direction of the water stream caused by the diffused air coincides with the direction of the screen meshes, so that fiber-like impurities caught in the screen of wedge wires or the like can be automatically eliminated therefrom and the pellet can hardly be caught in the screen, thereby preventing the clogging of the screen.

Alternatively, according to the invention, a rinsing mechanism such as a brushing or the like may be arranged according to cases which is used to rinse the screen of wedge wires or the like.

Also, according to the present invention, instead of the pellet formed by fixing nitrifying bacteria, other means can be used which is formed by attaching or fixing nitrifying bacteria or the like to a contact filling material having a large surface area. In this case, the inlet and outlet need not be composed of a screen of wedge wires or the like. However, the pellet is more effective than such means in stabling nitrifying reaction efficiently.

As has been described hereinbefore, according to the present invention, due to the fact that a nitrifying vessel unit or the like need only be put into and disposed in a biological reaction vessel such as a waste water treating vessel using activated sludge, the structure of the system can be simplified. Also, since a carrier containing nitrifying bacteria in a high density is disposed within a nitrifying vessel, the nitrifying reaction is allowed to progress in a stable and efficient manner. Further, by means of an air diffusion device arranged in the bottom portion of the nitrifying vessel, the power necessary for circulation of waste water can be reduced to thereby achieve an economical treatment.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A system for treating waste water by nitrification, comprising:
   a waste water treating vessel including a biological reaction vessel with an inlet for allowing original waste water to flow into said reaction vessel, and a nitrifying vessel containing therein a particulate pellet of fixed nitrifying bacteria for treating said waste water by nitrification, said particulate pellet comprising a particulate body of nitrifying bacteria covered and fixed by a gellable organic compound;
   a waste water inflow passage for sending said waste water from said biological reaction vessel to said nitrifying vessel;
   a waste water circulation passage for returning said waste water from said nitrifying vessel to said biological reaction vessel;
   an air diffusion device disposed in the bottom portion of said nitrifying vessel for supplying oxygen to the nitrifying bacteria of said particulate pellet by means of air diffused and returning said waste water in said nitrifying vessel through said waste water circulation passage to said biological reaction vessel by means of an air lift action to thereby circulate said waste water between said biological reaction vessel and said nitrifying vessel; and,
   a pellet separation device disposed in at least one of the waste water inflow passage and the circulation passage of said nitrifying vessel, for preventing outflow of said particulate pellet.

2. A system for treating waste water by nitrification as set forth in claim 1, wherein said nitrifying vessel is constructed as a nitrifying vessel unit including waste water inflow port and a waste water outflow port, one or more nitrifying vessel units are disposed within said waste water treating vessel, said biological reaction vessel comprises the other portions of said waste water treating vessel than said nitrifying vessel unit, and said biological reaction vessel forms an anaerobic vessel which performs a nitrogen removing treatment.

3. A system for treating waste water by nitrification as set forth in claim 2, wherein in the bottom portion of said anaerobic vessel there is arranged a stirrer and the outlet of said waste water circulation passage is formed adjacent to said stirrer.

4. A system for treating waste water by nitrification as set forth in claim 1, wherein said pellet separation device is a screen.

5. A system for treating waste water by nitrification as set forth in claim 4, wherein in the upper portion of said nitrifying vessel there is formed a waste water outflow port provided with wedge wires, and said wedge wires are inclined.

6. A system for treating waste water by nitrification as set forth in claim 1, wherein a flow control device is provided in said waste water circulation water passage.

7. A system for treating waste water by nitrification as set forth in claim 1, wherein said waste water inflow passage is provided with a plurality of inflow ports for flowing said waste water into said nitrifying vessel, and said waste water circulation passage is provided with a plurality of outflow ports for returning said waste water to said biological reaction vessel.

8. A system for treating waste water by nitrification as set forth in claim 1, wherein in said water circulation passage there is provided a hanging portion including a partition plate and an auxiliary air diffusion device is disposed in the lower portion of said hanging portion.

9. A system for treating waste water by nitrification as set forth in claim 1, wherein a clearance between the inner surface of said waste water treating vessel and the outer surface of said nitrifying vessel is provided for allowing said waste water within said waste water treating vessel to flow there through to a next step.

10. A system for treating waste water by nitrification as set forth in claim 1, wherein said gellable organic compound is polyethylene glycol.

* * * * *